Dec. 13, 1938.　　　　W. F. BIRD　　　　2,139,994
MULTISHED LOOM
Filed Jan. 16, 1936　　13 Sheets-Sheet 1
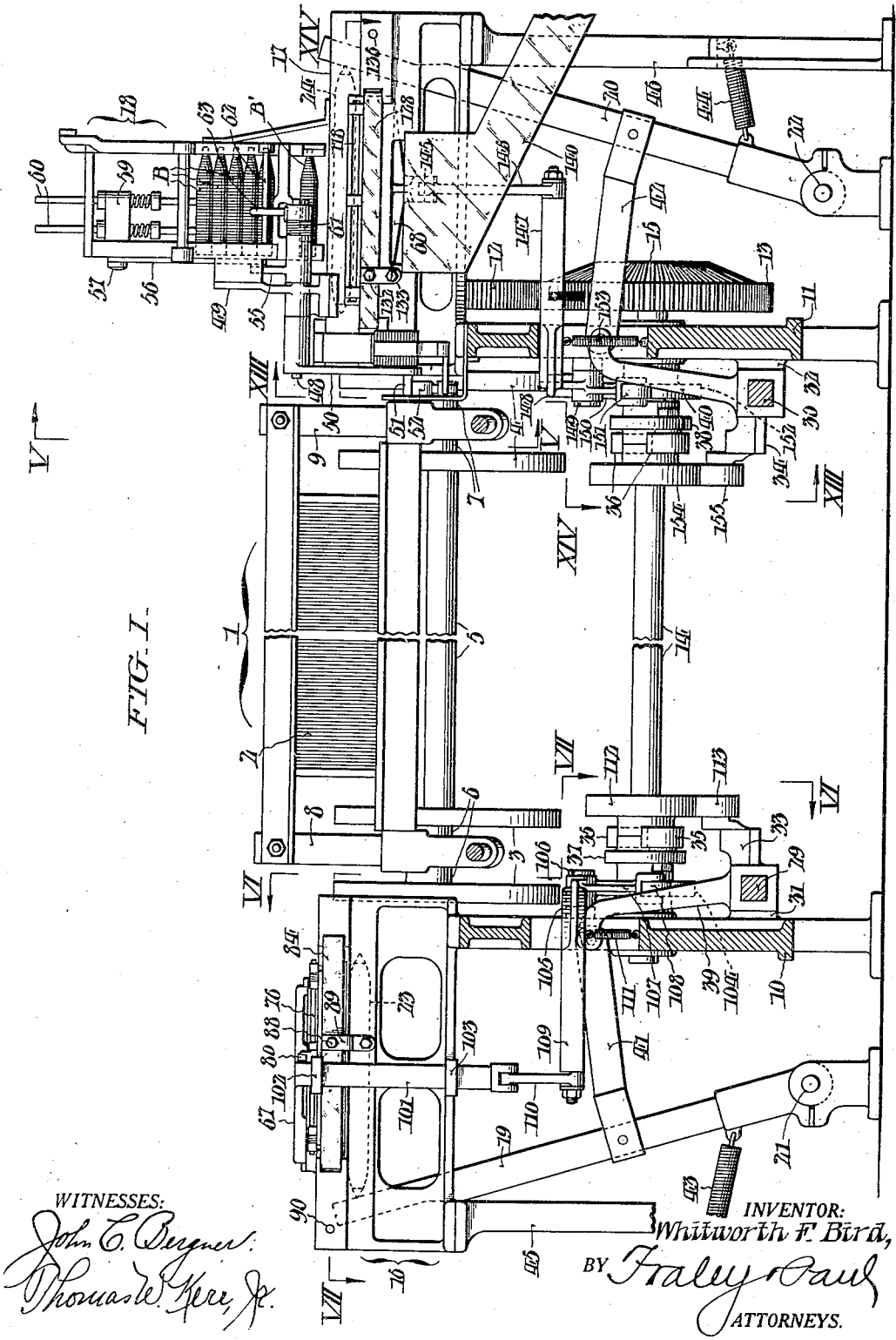
FIG. I.
WITNESSES:
John C. Bergner
Thomas W. Kerr, Jr.
INVENTOR:
Whitworth F. Bird,
BY Fraley & Paul
ATTORNEYS.

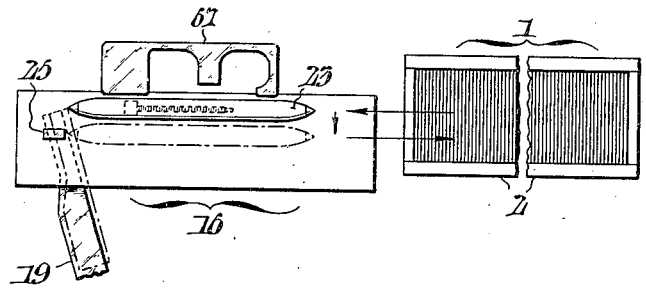
FIG. II.
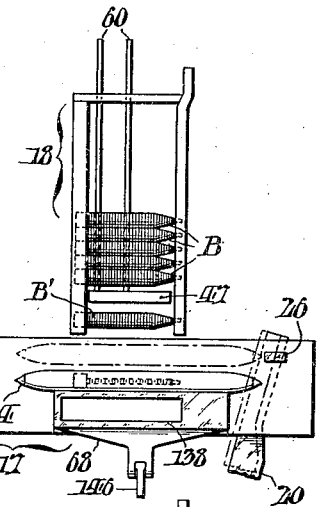
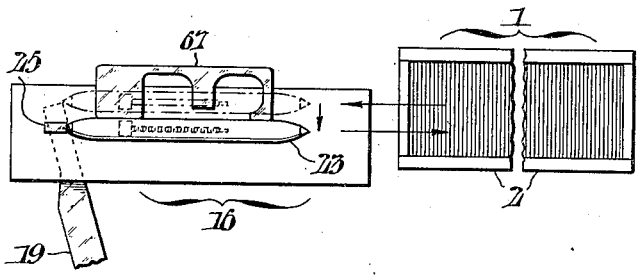
FIG. III.
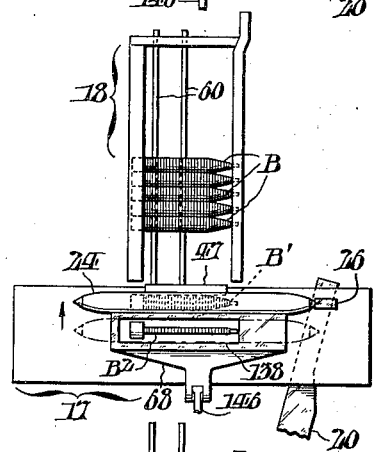
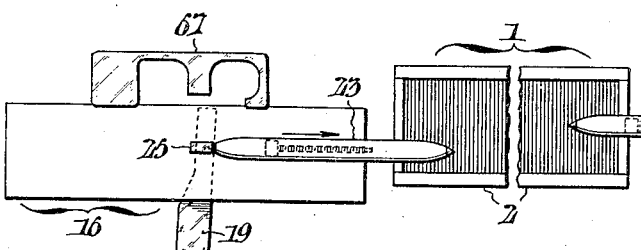
FIG. IV.
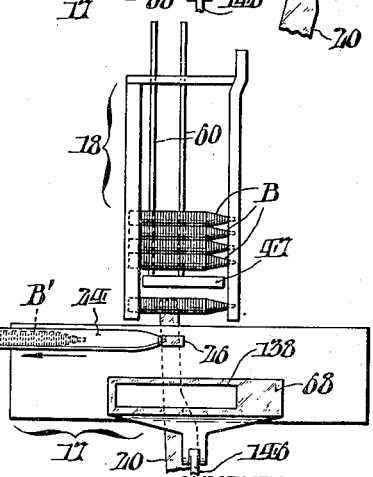

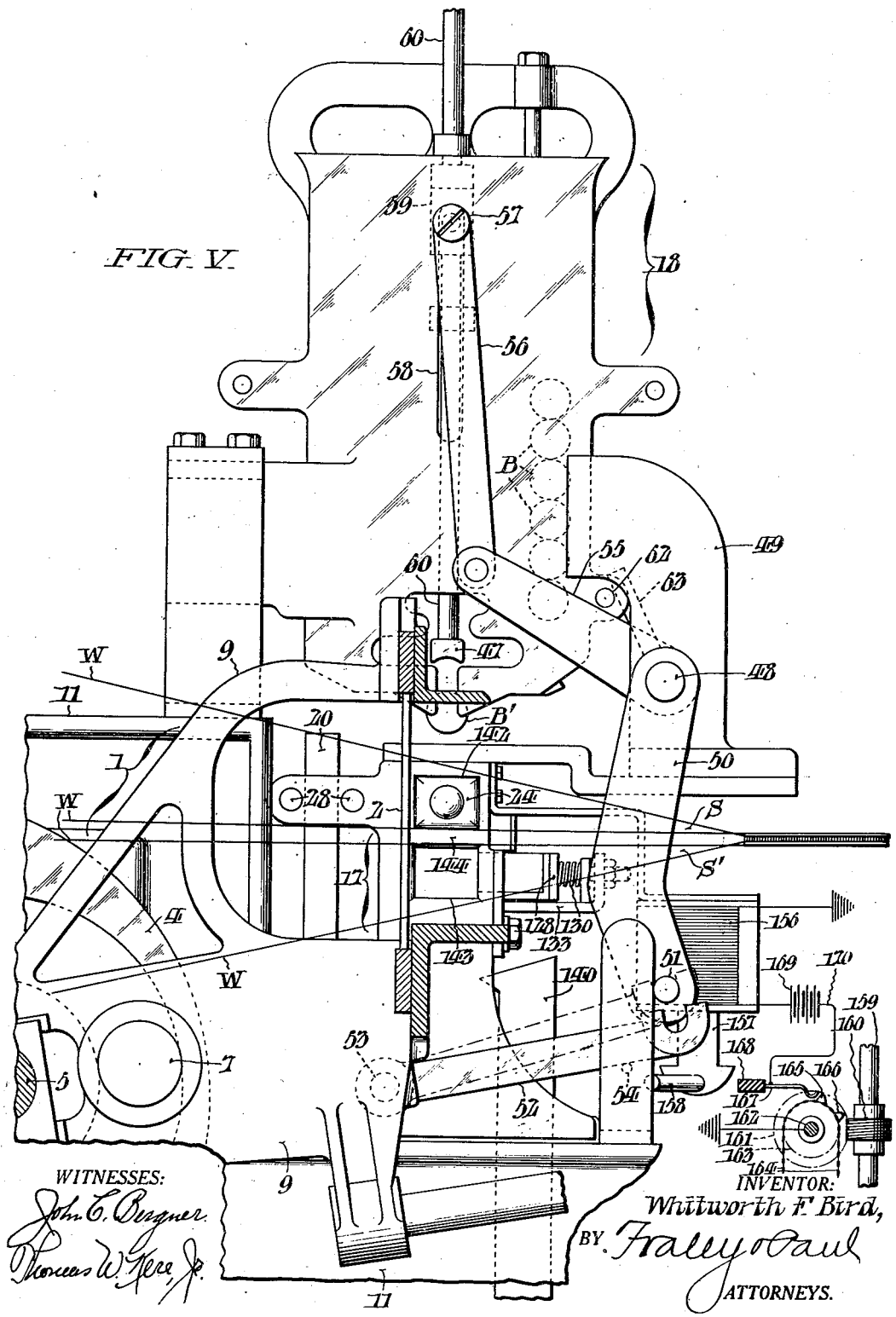

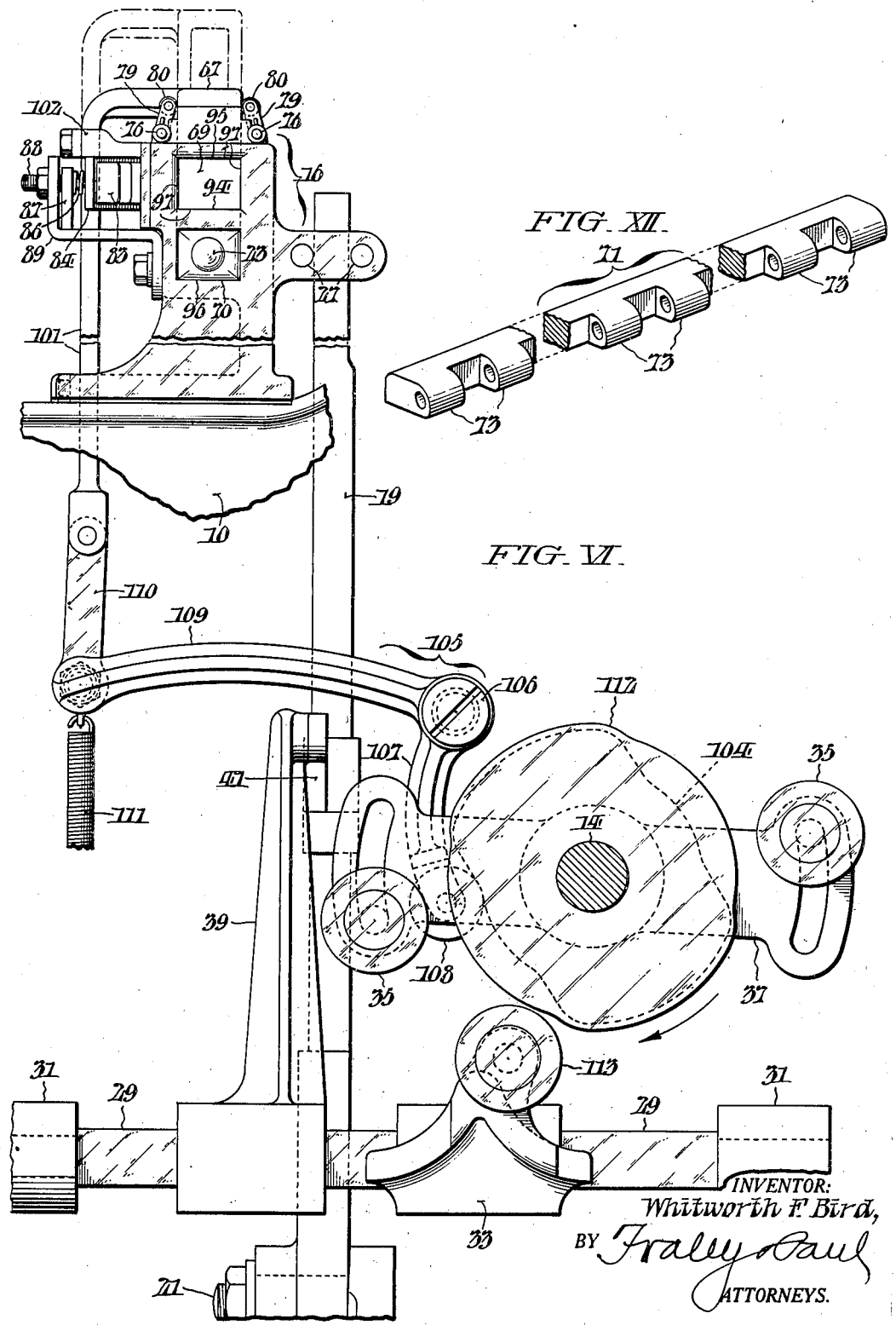

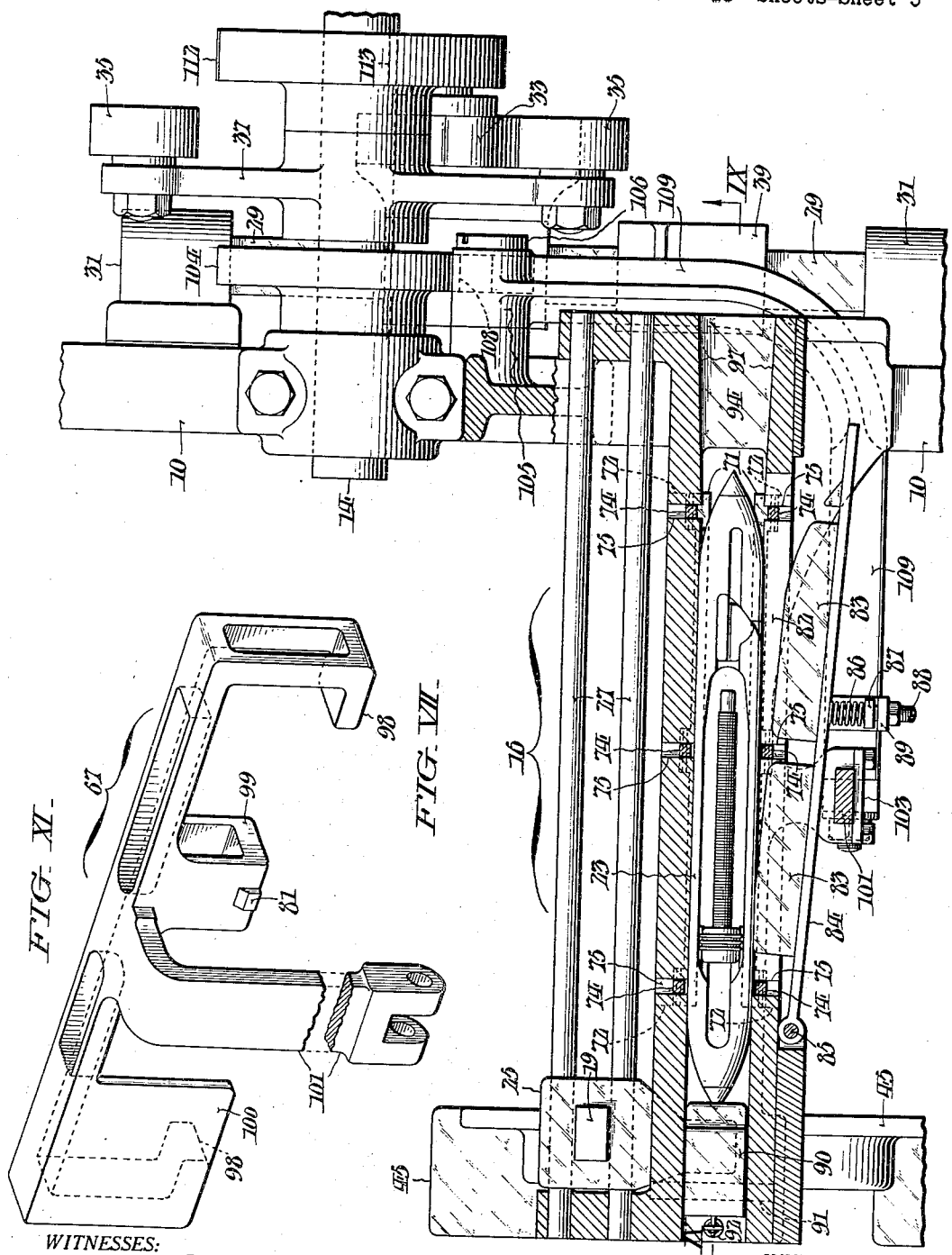

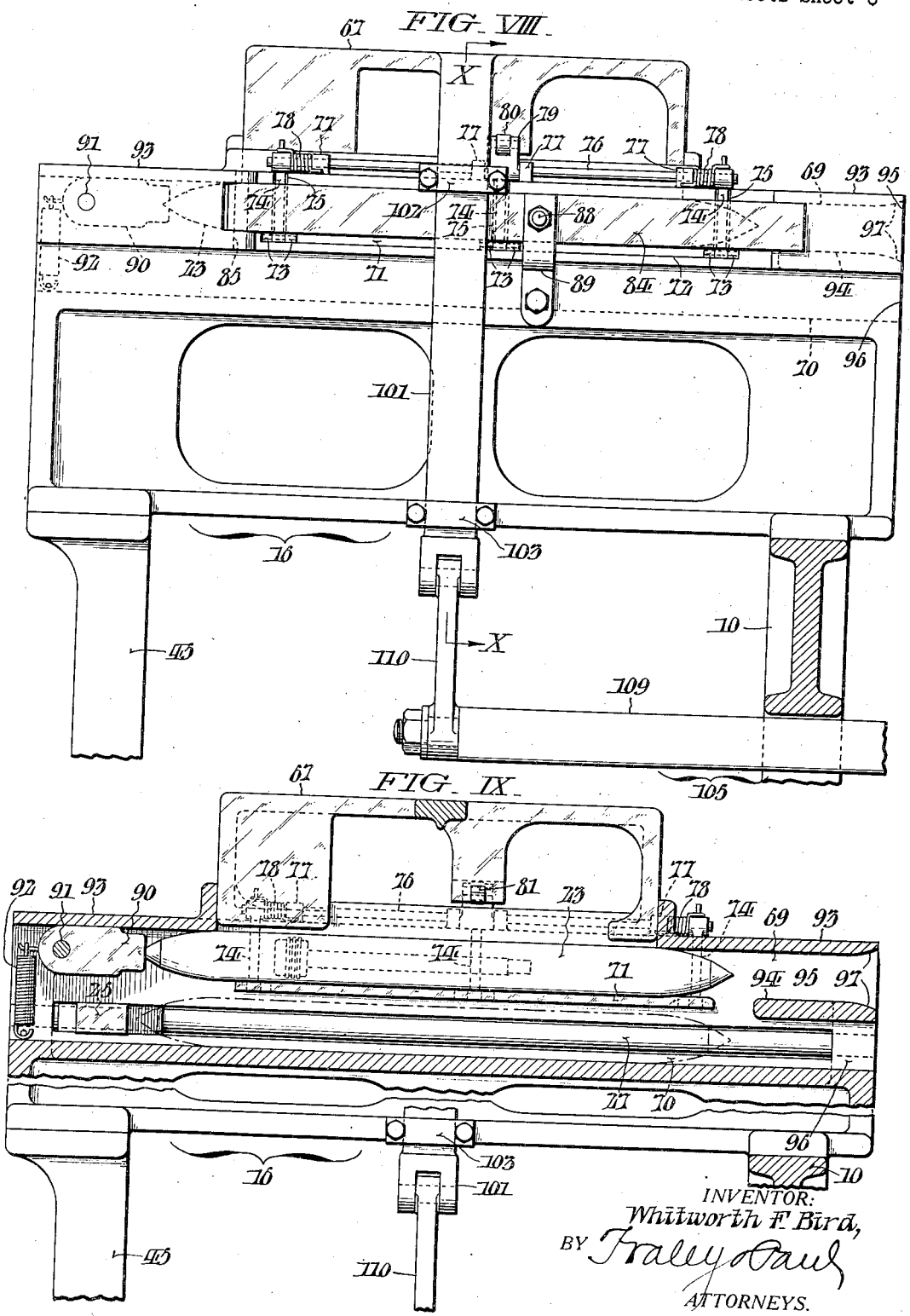

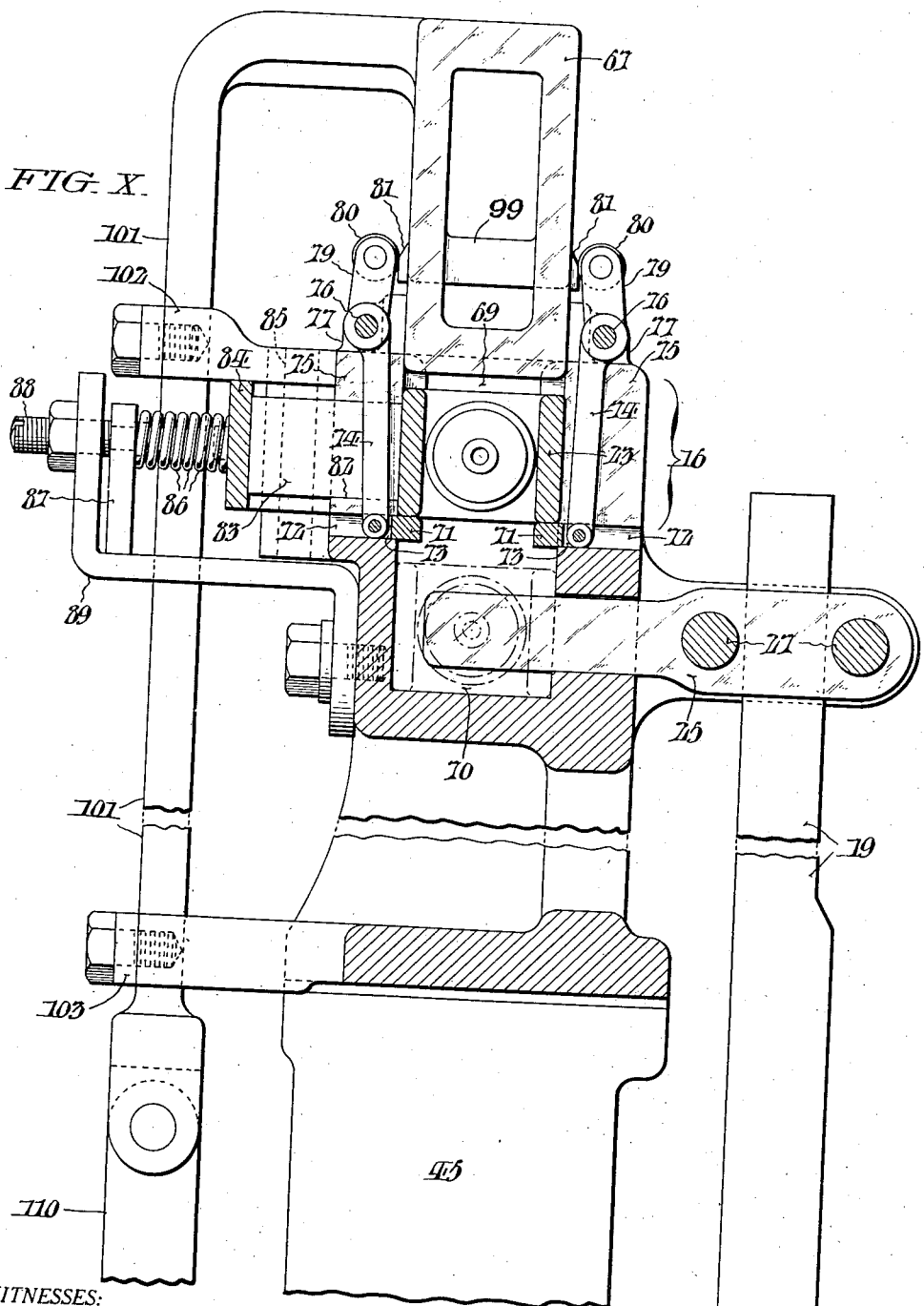

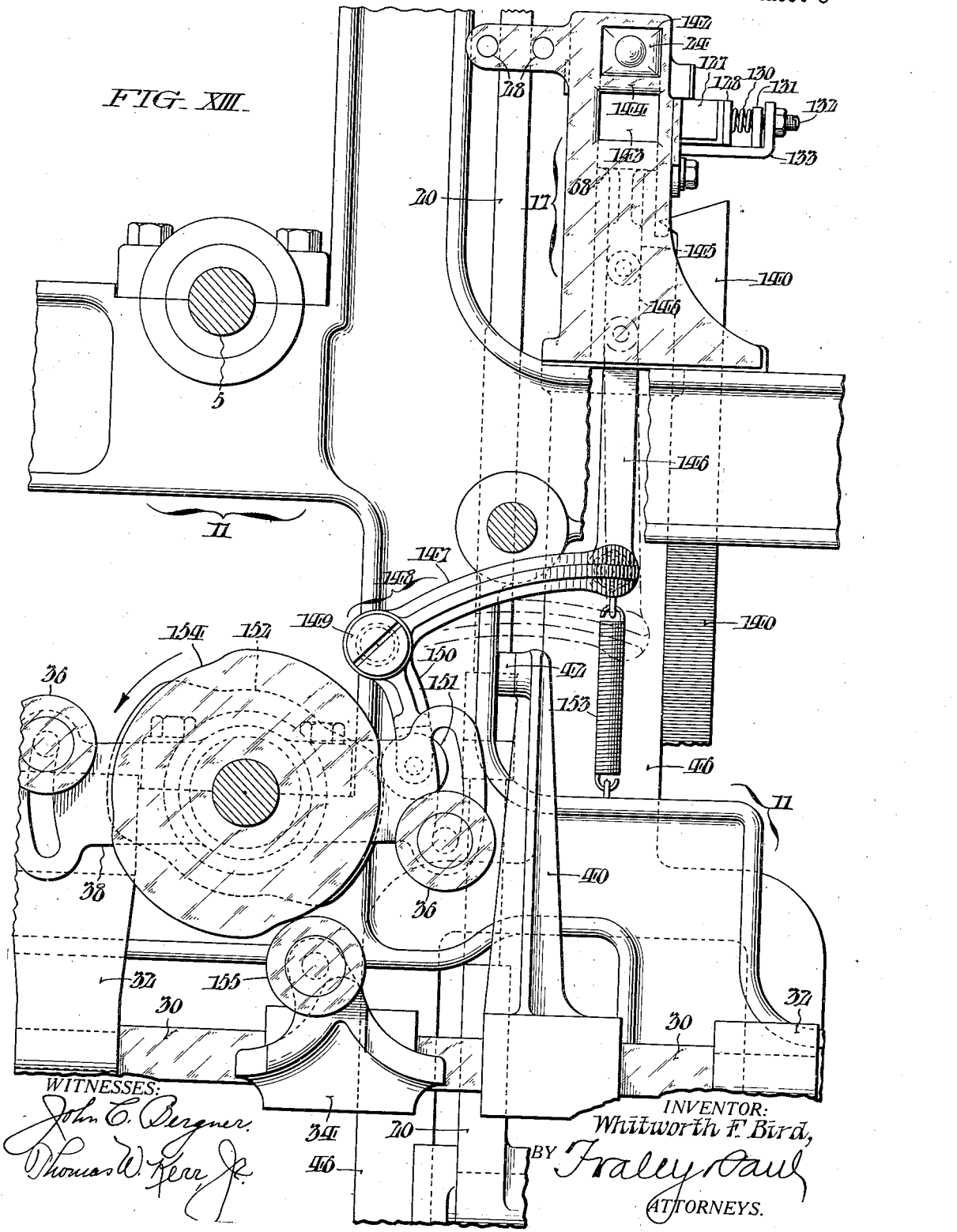

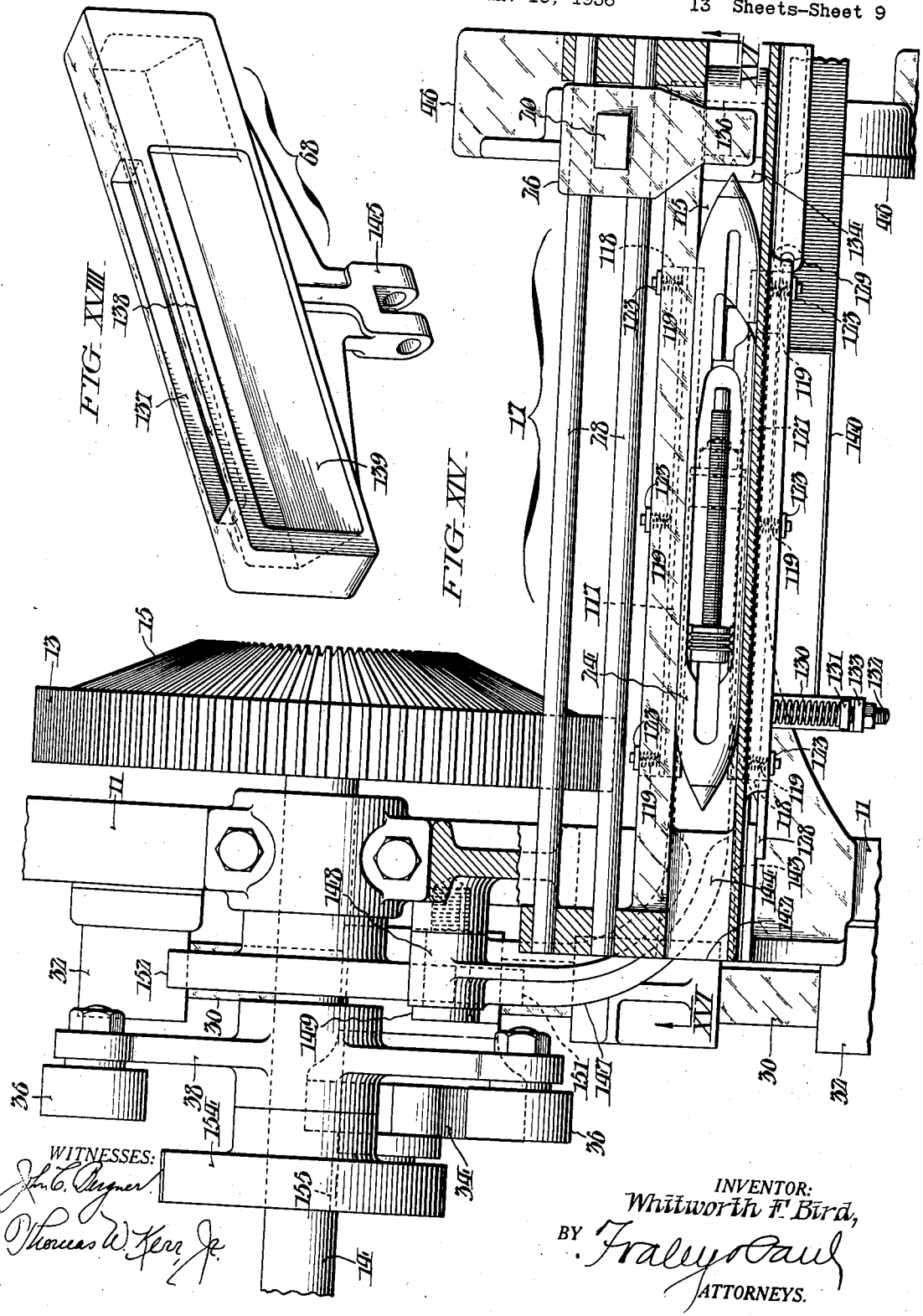

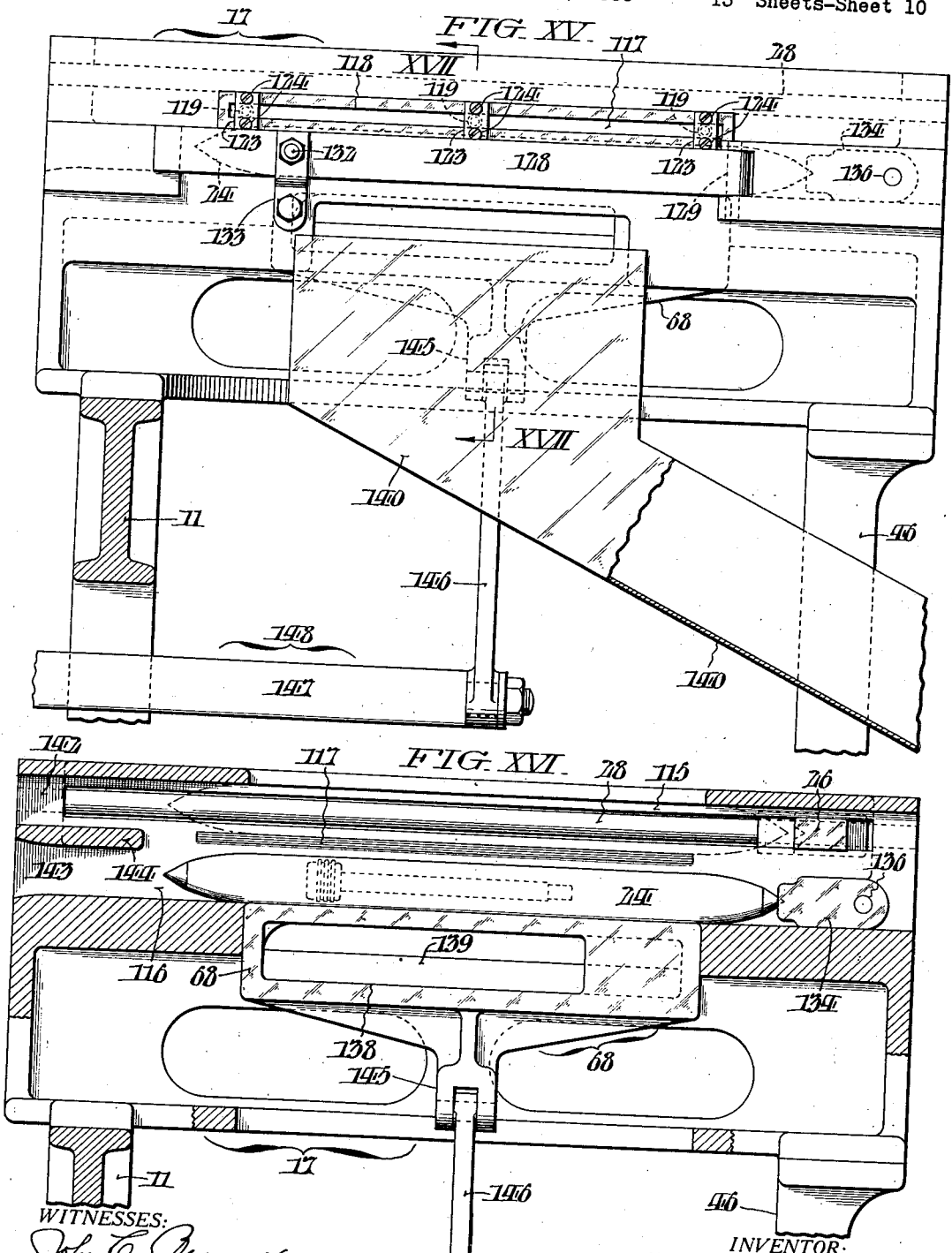

Dec. 13, 1938.   W. F. BIRD   2,139,994
MULTISHED LOOM
Filed Jan. 16, 1936   13 Sheets-Sheet 11
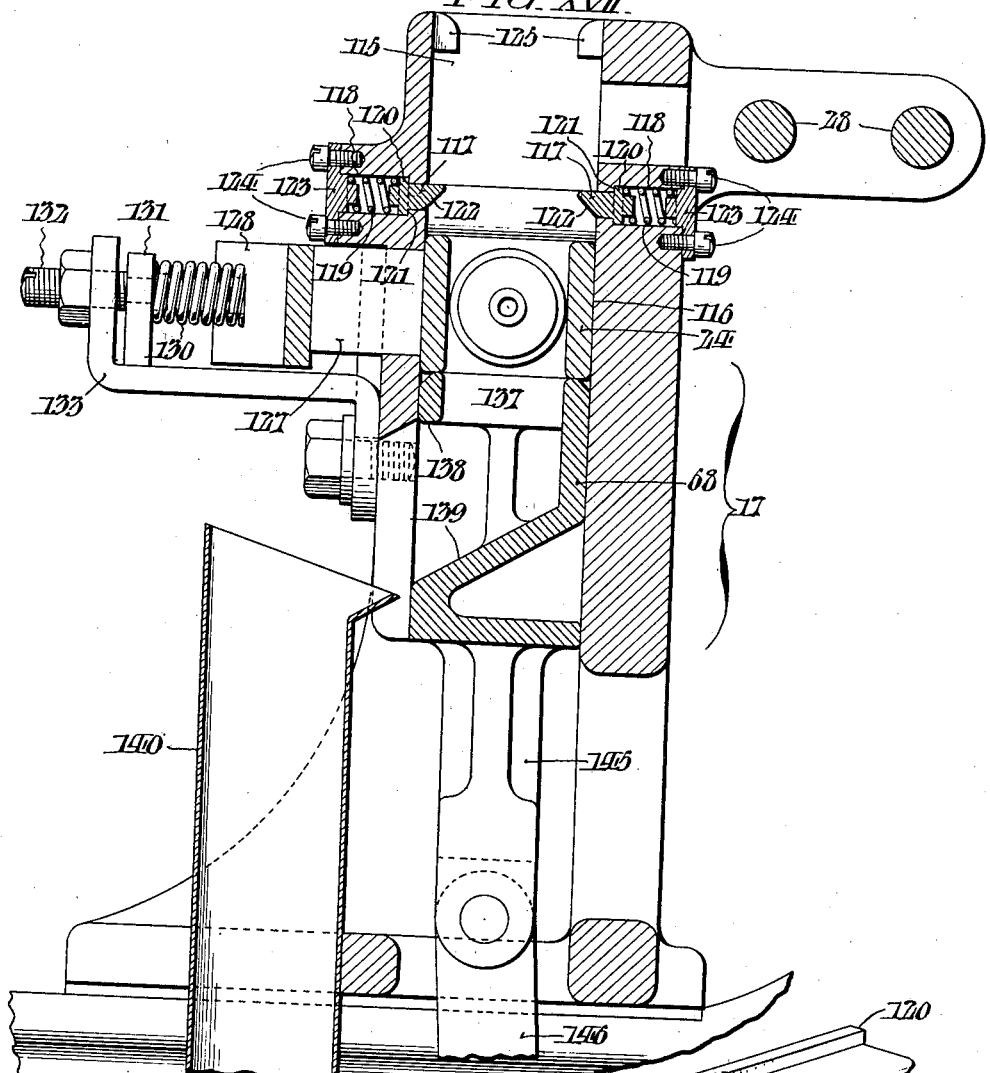
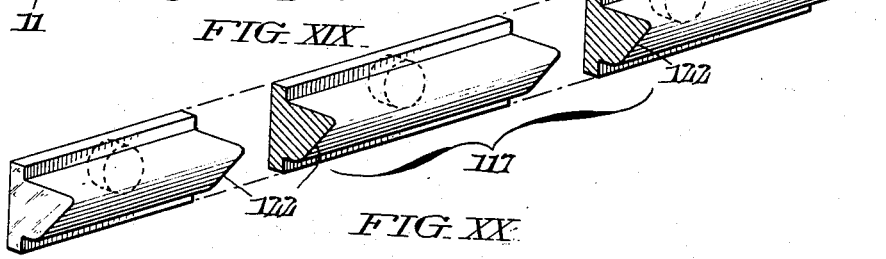
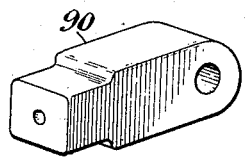
INVENTOR:
Whitworth F. Bird,
BY Fraley Paul
ATTORNEYS.

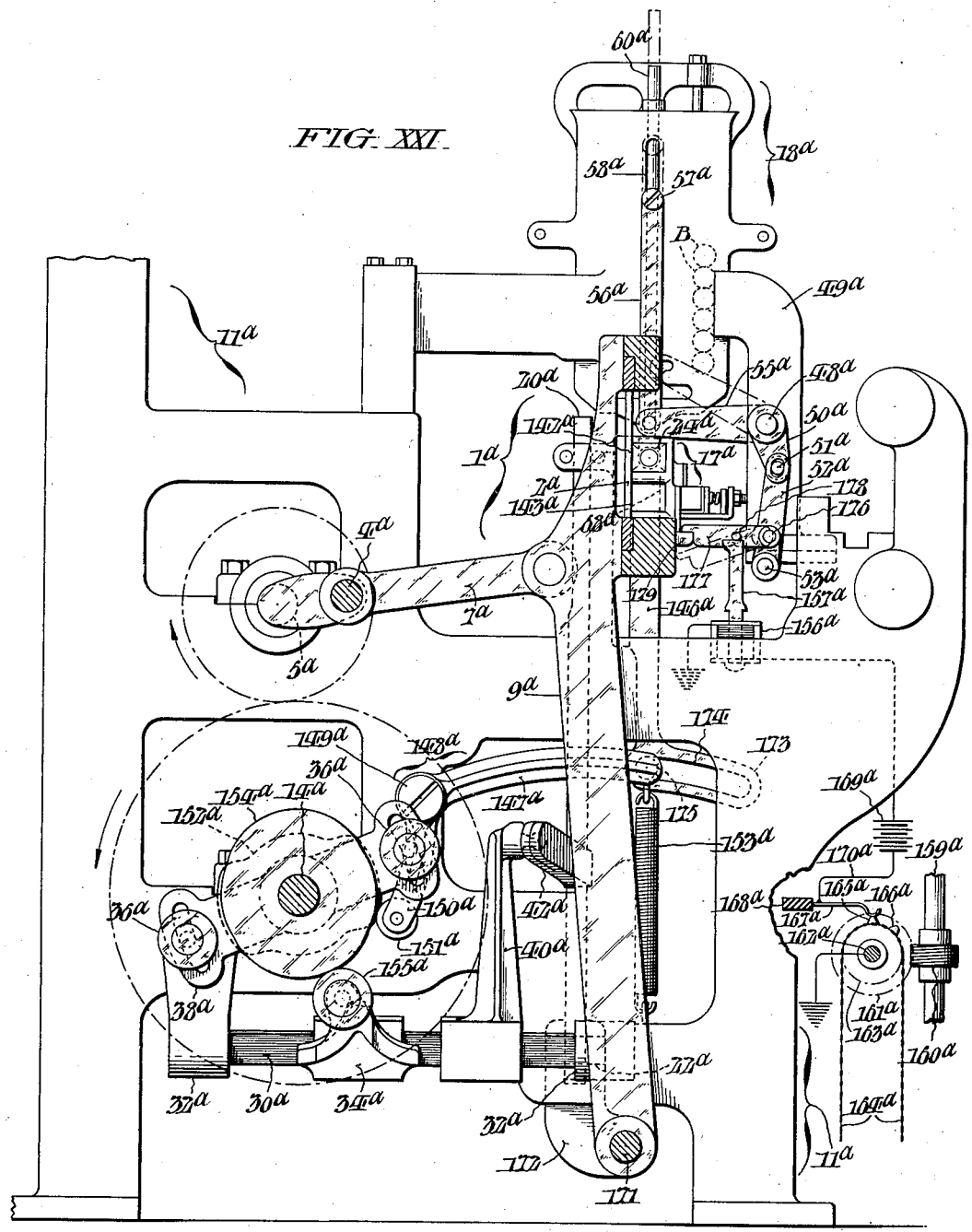

Dec. 13, 1938.     W. F. BIRD     2,139,994
MULTISHED LOOM
Filed Jan. 16, 1936     13 Sheets-Sheet 13
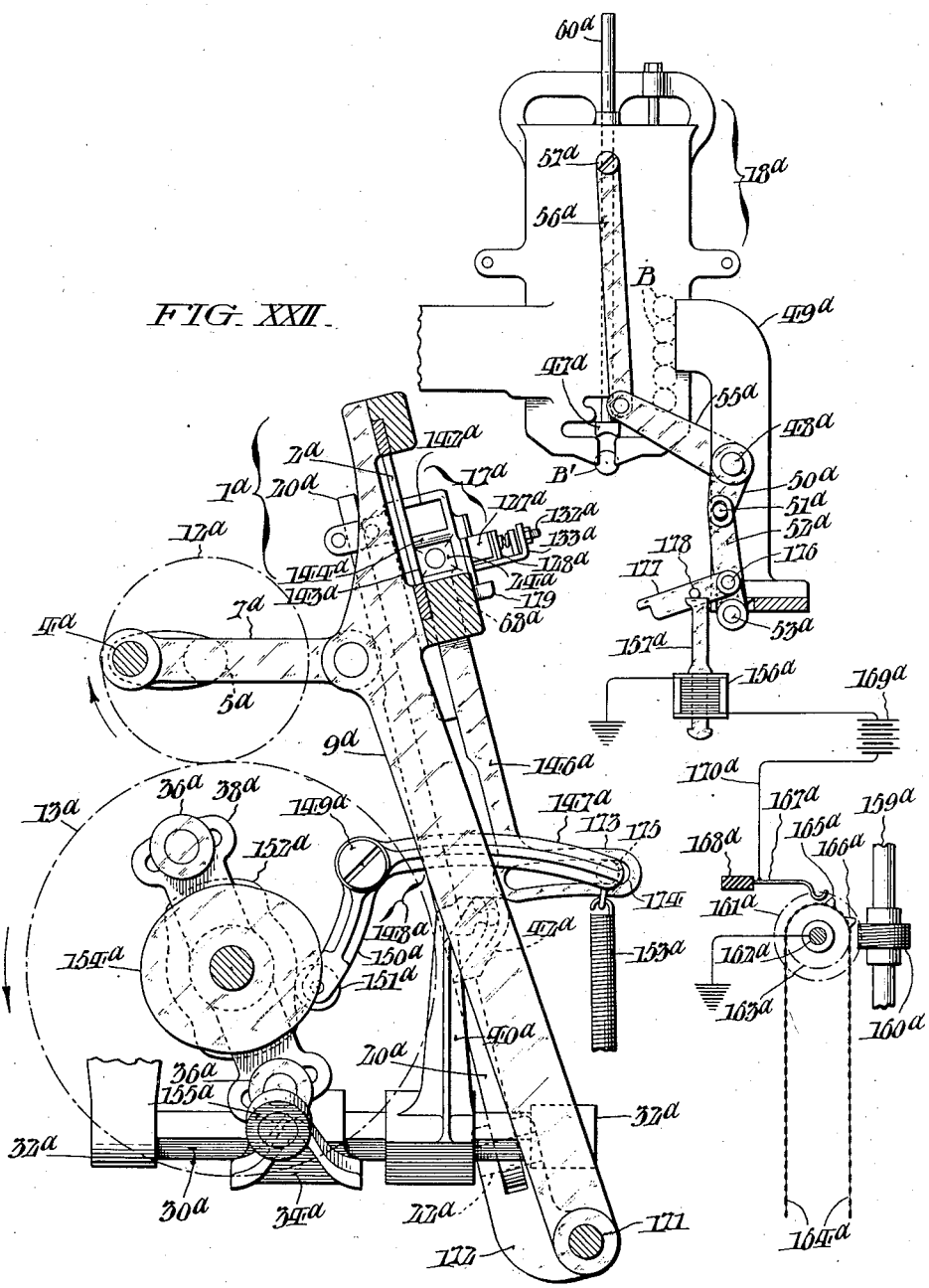
INVENTOR:
Whitworth F. Bird, Patented Dec. 13, 1938

2,139,994

UNITED STATES PATENT OFFICE 2,139,994

MULTISHED LOOM

Whitworth F. Bird, Springfield, Pa., assignor to Collins & Aikman Corporation, Philadelphia, Pa., a corporation of Delaware Application January 16, 1936, Serial No. 59,343

22 Claims. (Cl. 139—224)

This invention relates to looms wherein two shuttles are employed, and wherein the warps are so manipulated as to form two superposed reversing sheds through which the respective shuttles are concurrently passed in opposite directions at each pick, with resultant production, at one time, of two fabrics face to face. More particularly, my invention has reference to multi-shed looms with automatic weft-replenishing mechanism whereby replenishment is effected vertically, i. e. downwardly from above, while the lay is in its forward or beat-up position. Because of the superposed relation of the shuttles in such looms, difficulty has been experienced in effecting bobbin substitutions, notwithstanding projection of the shuttles simultaneously in opposite directions so that the shuttle box at the replenishing side of the loom is occupied by but one shuttle at a time for replenishment. It has also been proposed heretofore to effect weft replenishment in multi-shed looms by inserting the new weft supply substantially horizontally from one side of the shuttles, but this method of replenishment has also been found to have many disadvantages.

The aim of my invention is to overcome the drawbacks heretofore present in connection with weft replenishment in multi-shed looms, which desideratum I realize in practice, as hereinafter more fully disclosed, through provision of simple and reliable automatic mechanism whereby the two shuttles are caused to pass successively through one of the superposed sheds in one direction, and to return in like manner, through the other shed, this being made possible by transposal of the shuttles up and down respectively in the shuttle boxes at the end of each pick; and through provision of equally simple and reliable means for effecting weft replenishment vertically at different times while the shuttles individually occupy one of the shuttle boxes. It is clear that the arrangement and operation of parts will ultimately result in two fabrics in which the wefts have been blended.

As will be readily understood from subsequent disclosure herein, my invention is adaptable to double fabric looms of the type wherein the shuttle boxes are stationary, as well as to that type of double fabric loom wherein the shuttle boxes move with the lay.

Other objects and attendant advantages will also appear from the following detailed description of the attached drawings, wherein Fig. I is a view in front elevation of a double fabric weft replenishing loom with stationary shuttle boxes conveniently embodying the present improvements, portions of the loom frame being broken away to avoid concealment of important details.

Figs. II, III and IV are diagrammatic views corresponding to Fig. I showing the circuit of the shuttles, and the manner in which bobbin replacements are effected.

Fig. V is a fragmentary longitudinal sectional view of the loom taken as indicated by the arrows V—V in Fig. I, and looking toward the right hand shuttle box.

Fig. VI is a fragmentary longitudinal sectional view taken as indicated by the arrows VI—VI in Fig. I, and looking toward the left hand shuttle box.

Fig. VII is a fragmentary plan sectional view of the left hand shuttle box taken as indicated by the arrows VII—VII in Fig. I.

Fig. VIII is a fragmentary view drawn to a larger scale and showing the left hand shuttle box in front elevation.

Fig. IX is a vertical longitudinal sectional view through the left hand shuttle box as indicated by the arrows IX—IX in Fig. VII.

Fig. X is a transverse sectional view of the left hand shuttle box taken as indicated by the arrows X—X in Fig. VIII.

Fig. XI is a perspective view of a depressor associated with the shuttle in the left hand shuttle box.

Fig. XII is a perspective view of one of the shuttle supports for the left hand shuttle box.

Fig. XIII is a longitudinal sectional view of the loom taken as indicated by the arrows XIII—XIII in Fig. I and looking toward the right hand shuttle box.

Fig. XIV is a plan sectional view of the right hand shuttle box taken as indicated by the arrows XIV—XIV in Fig. I.

Fig. XV is a view drawn to a larger scale and showing the right hand shuttle box in front elevation.

Fig. XVI is a vertical longitudinal sectional view through the right hand shuttle box taken as indicated by the arrows XVI—XVI in Fig. XIV.

Fig. XVII is a transverse sectional view of the right hand shuttle box taken as indicated by the arrows XVII—XVII in Fig. XV.

Fig. XVIII is a perspective view of an elevator associated with the shuttle in the right hand shuttle box.

Fig. XIX is a perspective view of one of the shuttle supports for the right hand shuttle box.

Fig. XX is a perspective view of a stop whereof one is used in each of the shuttle boxes.

Fig. XXI is a view corresponding to Figs. V and XIII showing my invention embodied in a loom having a pivoted lay, with the lay in its beat-up position; and Fig. XXII is a view similar to Fig. XXI with a lay in its retracted position.

The loom which I have for convenience chosen to illustrate the embodiment of my invention featured in Figs. I–XX, is generally of the type disclosed in a co-pending patent application Serial No. 750,626, filed by me jointly with William R. Hewton on October 30, 1934. The lay comprehensively designated by the numeral 1 in Figs. I–IV carries a reed 2 and is reciprocated in a substantially horizontal plane to perform its beat strokes, with determination of dwell periods in retracted position, through cooperation between rotary cams 3, 4 on a transverse shaft 5, and rollers 6 and 7 on rearwardly extending end frames 8 and 9 of said lay. The shaft 5 is journaled at its ends in the side frames 10 and 11 of the loom, and receives continuous rotary motion, through a pair of intermeshing spur gears 12 and 13, from the main shaft 14 of the loom. As shown, the main shaft 14 is journaled in bearings on the side frames 10 and 11 at a level below the cam shaft 5, and driven by power applied to a bevel gear wheel 15 which is mounted thereon directly adjacent the spur wheel 13. By suitable means (not illustrated) the warps W (Fig. V) are automatically manipulated during the weaving to form reversing sheds S, S' after a manner well known in the art. At opposite sides of the loom are stationary shuttle boxes 16, 17, whereof the right hand shuttle box 17 is surmounted by a storage magazine 18 containing filled weft bobbins B. By means of picker sticks 19, 20 fulcrumed at their lower ends to swing on fixed pivots 21, 22, the two shuttles indicated at 23 and 24 are concurrently projected in opposite directions across the lay 1 when the latter is in its retracted position, between the shuttle boxes 16 and 17. At their upper ends, the picker sticks 19, 20 engage pickers 25, 26 (Figs. II–IV) which slide on guide rods 27, 27 and 28, 28 at the backs of the shuttle boxes 16, 17, and which project respectively into the shuttle boxes through horizontal slots in the latter. The mechanism for actuating the picker sticks 19, 20, includes longitudinally-extending square-section rock shafts 29, 30 with cylindric ends journaled in bearings 31, 31 and 32, 32 on the side frames 10 and 11 of the loom. Affixed to the rock shafts 29, 30 intermediate the bearings 31, 31 and 32, 32 respectively, are bat wing cams 33, 34 which lie in the path of picker balls 35, 35 and 36, 36 respectively at opposite ends of double carrier arms 37, 38 secured to the main shaft 14. The motion thus induced in the rock shafts 29, 30 is communicated, through arms 39, 40 on them coupled with the picker sticks 19, 20, by flexible connecting straps 41, 42 respectively, the inward movements of said picker sticks being opposed by helical tension springs 43, 44, which, at one end, are connected to said picker sticks and at the other end to fixed anchorages on supplemental side frames 45, 46 which support the outer ends of the shuttle box 16, 17. As in the copending patent application above referred to, the filled bobbins B are individually released from the magazine 18 to roll into position beneath an ejecting plunger 47. The parts instrumental in effecting ejection of successive bobbins B from the magazine include a rock shaft 48 which is journaled in a fixed bracket 49 whereby the magazine 18 is supported. Fast on the rock shaft 48 is a pendant arm 50 with a laterally-projecting stud 51 at its swinging end adapted to be engaged by a hook lever 52 fulcrumed at 53 to the end frame 9 of the lay. Normally, the hook lever 52 is out of the range of the pin 51 and rests on a fixed stop 54. Also secured to the rock shaft 48 is a rearwardly-extending arm 55 which is coupled, by means of a vertical link 56, with a stud 57 which extends laterally through a vertical slot 58 in one of the sides of the magazine 18 from a head 59 carrying the supporting rods 60 for the ejecting plunger shown at 47. A torsion spring 61 (Fig. I) fixed to the hub of the arm 55 tends to rotate the rock shaft 48 in a clockwise direction in Fig. V in exactly the same manner as disclosed in U. S. Patent No. 2,067,761, granted to William R. Hewton on January 12, 1937 on an application which was pending at one time with the present application. When the hook lever 52 is coupled with the arm 50 as later on explained, the shaft 48 is swung counterclockwise against the action of the spring 61 during the succeeding beat stroke of the lay 1, with attendant downward ejection of the waiting bobbin B' from the magazine 18 by the plunger 47 after a manner common to transferers of automatic filling replenishing looms.

In order to adapt a loom of the type briefly described to the purposes of my invention, I have made provisions whereby the shuttles are caused to pass successively through the upper shed S incident to being projected from the right hand shuttle box 17, and through the lower shed S' in being projected from the left hand box 16, as indicated respectively by the horizontal arrows in Figs. II–IV. Vertical transposal of the shuttles from the upper level to the lower level in the left hand shuttle box 16 is effected by a depressor 67 which is shown in perspective in Fig. XI, and from the lower level to the upper level in the right hand shuttle box, by an elevator 68 which is shown in perspective in Fig. XVIII.

Referring to Figs. VI–X, the left hand shuttle box 16 is open at the top for entry of the depressor 67; and upper and lower shuttle cells 69, 70 are set apart therein by dividing ledge bars 71 which are disposed within longitudinal slots 72 in the opposite sides of the shuttle box, and which normally project a short distance into said box to support the shuttles in the upper cell. The bars 71, whereof one is shown in perspective in Fig. XII, have spaced pairs of lateral ears 73 for pivotal connection to the lower swinging ends of actuating arms 74 of which there are three in each group and which operate in vertical openings 75 in the opposite sides of the shuttle box 16. The arms 74 are respectively secured to longitudinal shafts 76 journaled in fixed bearings 77. Torsion springs 78 influential on the shafts 76, serve to yieldingly urge the shuttle supporting bars 71 outward of the shuttle box 16. The central arms 74 of the two groups are formed with upward yoked bearing extensions 79 for rollers 80 which are adapted to be acted upon by cam projections 81 at opposite sides of the depressor 67. From Fig. X it will be observed that the cam projections 81 are so disposed as to pass below the rollers 80 and thereby permit the shuttle supports 71 to be withdrawn under the action of the torsion springs 78 before the depressor 67 engages the shuttles to depress them into the lower cell 70 of the box. Projecting through a longitudinal opening 82 in the front wall of the shuttle box 16 at the level of the upper cell 69 is a check 83 which serves to decelerate the shuttles in their flight as they enter said box. As shown, the shuttle check 83 is carried by an arm 84 capable of swinging about a fixed pivot 85, see Fig. VII, said arm being pressed inward of the shuttle box by a spring 86. At its outer end the spring 86 abuts against a plate 87 which is adjustable by means of a regulating screw 88 having threaded engagement in a fixed bracket 89. Immediately within the outer end of the shuttle box 16 at the upper level is a shuttle stop 90 which, as the shuttle is depressed, is free to swing downward about a pivot 91 in opposition to a spring 92 which tends to normally maintain it in horizontal position with its upper edge engaging the top wall 93 of the shuttle box. At the inner end of the shuttle box 16 is a short horizontal partition 94 which defines ingress and egress openings 95, 96, respectively at the upper and lower levels 69 and 70, the ingress opening being flared as at 97 to facilitate entrance of the shuttles and to insure their reception. The egress opening 96 is dimensioned for close fitment of the shuttles so that the latter are directed with positiveness and accuracy at the start for travel without wavering from a true horizontal line enroute to the right hand shuttle box 17. As shown in Fig. XI, the depressor 67 has pendant end feet 98 for engaging the shuttle adjacent opposite ends, and an intermediate pendant portion 99 which carries the cam projections 81. The depressor 67 is further provided at one end with a pendant side flange 100 which serves to hold the shuttle check 83 in its outer position while the shuttle is being lowered from the upper to the lower cells of the shuttle box 16. The depressor 67 also has a supporting shank 101 which is slidingly engaged in vertically spaced guides 102, 103 at the front of the shuttle box 16. The required up and down movements are imparted to the depressor 67 through mechanism which embodies a rotary cam 104 on the main shaft 14, and a bell crank lever 105 which is fulcrumed to oscillate about a screw 106 on the frame 10 of the loom. The pendant arm 107 of the bell crank lever 105 carries a roller 108 for engaging the rotary cam 104, while the horizontal arm 109 of said bell crank is coupled, by means of a link 110, with the lower end of the depressor shank 101. A spring 111 connected at one end to the horizontal arm 109 of the bell crank 105 and at the other to a fixed anchorage (not shown) on the loom frame 10, maintains the roller 108 in engagement with the cam 104. From Fig. VI it will be noted that the cam 104 has two diametrical rises so that the depressor is operated twice during each rotation of the main shaft 14. Obviously, by virtue of the arrangement just described the spring 111 will yield in the event of a shuttle sticking in the upper cell of the shuttle box 16 and thereby prevent breakage of the parts.

As shown in full lines in Fig. II, the picker sticks 19 and 20 in their outward swing move far enough to prevent fouling of the pickers 25, 26 by the shuttles as the latter are transposed vertically in the shuttle boxes 16, 17. Before the next picks, however, the picker sticks 19 and 20 are advanced slightly as indicated in dot and dash lines in Fig. II to an extent which will bring the pickers 25 and 26 into engagement with the corresponding ends of the shuttles so that no lost motion will occur between the pickers and the shuttles during shuttle projection. This preparatory advance movement of the picker stick 19 is accomplished by another rotary cam 112 on the main shaft 14 having diametrical rises adapted to coact with a roller 113 on the bat wing cam 33.

The appointments for the right hand shuttle box 17 are substantially like those just described in connection with the left hand shuttle box 16. Referring to Figs. XIII–XVII, the right hand shuttle box 17 is vertically open for entry of the elevator 68 from beneath, and for insertion of the replacement weft bobbins from above. Upper and lower shuttle cells 115 and 116 are set apart within the shuttle box 17 by dividers in the form of ledge bars 117 which occupy longitudinal slots 118 in the opposite sides of said box. By means of springs 119, the bars 117 are yieldingly urged inward as far as permitted by engagement of stop flanges 120 on them with shoulders 121 in the slots 118, so that the beveled portions 122 of said bars normally project into the shuttle box as shown in Fig. XVII. At their outer ends, the springs 119 bear against removable abutment plates 123 secured crosswise of the slots 118 by screws 124. As the shuttles are transposed upwardly from the lower cell 116 of the shuttle box 17 into the upper cell 115, the bars 117 are pushed outward in opposition to the springs 119 through coaction of their bevels 122 with the shuttle sides. Inwardly projecting stop lugs 125 at the top of the shuttle box 17 prevent the shuttles from being thrust out of said box when they are raised by the elevator 68. At the level of its lower cell 116, the shuttle box 17 is provided with a check 127 which is secured to an arm 128 capable of swinging on a fixed pivot 129. The arm 128 is yieldingly urged inward by an adjustable spring 130 which engages an abutment plate 131 adjustable by a screw 132 on a fixed bracket 133. Within the outer end of the shuttle box 17 at the lower level 116 is a stop 134 by which the shuttles are arrested in an aligned position to receive filled bobbins from the magazine 18 when replenishment is indicated. The shuttle stop 134 is normally in the horizontal position shown in Fig. XVI, but as the shuttles are raised by the elevator 68, it is free to swing upward about a pivot 136. The shuttle elevator 68, see Fig. XVIII, is hollow and has openings 137 and 138 respectively in its top and in one of its sides. The empty bobbins ejected from the shuttles as a result of replacement by filled ones, fall into the opening 137 in the top of the elevator 68 and are discharged laterally through the side opening 138 by a sloping surface indicated at 139. The empty bobbins so discharged fall into an inclined chute 140 which leads to a suitable receiver not illustrated. In the planes of its upper and lower cells, the shuttle box 17 has egress and ingress openings 142 and 143 respectively at its inner end, defined by a relatively short horizontal partition 144. The openings 142, 143 are constructed exactly like those of the left hand shuttle box 16, so that, on the one hand, the entrance of shuttles is facilitated, and on the other hand, said shuttles are started on a true horizontal course for passage in a direct line through the top shed S to the upper cell of said left hand shuttle box. At the bottom the elevator has a clevised projection 145 which, through a link 146, is coupled with the horizontal arm 147 of a bell crank lever 148 fulcrumed at 149 on the side frame 11 of the loom. The pendant arm 150 of the bell crank lever 148 carries a roller 151 for cooperation with a double-lobed rotary cam 152 on the main shaft 14. A helical tension spring 153, connected at one end to the horizontal arm 147 of the bell crank lever 148 and at the other end to the side frame 11, yieldingly resists lifting of the elevator 68 under the action of the rotary cam 152. Another rotary cam 154 with diametral rises is fixed on the main shaft 14 alongside the rotary cam 152 which coacts with a roller 155 on the bat wing cam 34 to move the picker stick 20 slightly inward after the shuttles have been raised from the lower to the upper level in the shuttle box 17, whereby the picker 20 is brought into engagement with the shuttles before the latter are projected across the lay 1.

Bobbin substitutions are initiated by action of an electric device in the form of a solenoid 156 (Fig. V) whereof the armature 157 has a lateral pin 158 which under-reaches the swinging end of the hook lever 52. The energizations of said solenoid take place when the lay 1 is in its retracted position to effect coupling of the hook lever 52 with the pin 51 on the pendant arm 50 of the rock shaft 48 as shown in dot and dash lines in Fig. V. Thus, upon the next beat stroke of the lay 1, the pendant arm 50 is actuated to turn the shaft 48 counterclockwise, with resultant depression of the plunger 47 and ejection of the awaiting bobbin B' from the magazine into whichever shuttle occupies the upper cell 142 of the box and while such shuttle is supported by the elevator 68. Energization of the solenoid may be effected at substantial exhaustion of the bobbins as in the aforementioned copending application Ser. No. 750,626, and is controlled by mechanism diagrammatically illustrated in Fig. V, comprising a shaft 159 which may be driven, through suitable gearing (not shown), from either the cam shaft 5 or the main shaft 14, and which carries a worm 160 that meshes with a worm wheel 161 on a counter shaft 162. Secured to the counter shaft 162 is a sprocket wheel 163 for a timing chain 164 with spaced contact lugs 165, 166 thereon adapted to wipe against a spring finger 167 which is anchored in a fixed block 168 of insulation. The finger 167 is connected, with the solenoid 156 and a battery 169, in an electric circuit 170 which is grounded through the framework of the loom. The spacing of the contact lugs 165 and 166 on the chain is such as to determine the time of substantial exhaust of the shuttles and to initiate bobbin replacements when the individual shuttles 23, 24 occupy the shuttle box 17 at different times.

The operation of the loom can be readily understood from Figs. II-IV. In Fig. II, the shuttle 23 has just been received by the box 16 after having been projected at the upper level from right to left, and the shuttle 24 by the box 17 after having been concurrently projected at the lower level from left to right. In Fig. III, the shuttle 23 has just been depressed by the depressor 67 to the lower level in the box 16 and the shuttle 24 elevated to the upper level in the box 17 by the elevator 68. Moreover, in Fig. III, an exhausted bobbin B² has just been displaced by a fresh filled bobbin B¹ inserted into the shuttle 24 by the plunger 47 of the weft replenishing mechanism while said shuttle is supported by the elevator 68, the exhausted bobbin falling into the hollow of said elevator for ejection through the side opening 138 of the latter. Fig. IV shows the newly filled shuttle 24 moving leftward on its way to the shuttle box 16 and the substantially exhausted shuttle 23 moving rightward on its way to the shuttle box 17 for replenishment in exactly the same manner as described above. The shuttles 23, 24 thus pass successively through the upper shed S always in one direction and successively through the lower shed S' in the opposite direction with continuous repetitions of the cycle throughout the weaving, and are automatically replenished when required under control of the timing chain 164 without stoppage of the loom. Due to the circuitous course followed by the two shuttles, the weft will obviously be blended in the two superposed fabric layers concurrently produced by the loom, which feature has certain advantages over depressing and elevating the shuttles only during the weft replenishing cycles.

In order to preclude the necessity for repetitive description in connection with the modified form of my invention shown in Figs. XXI and XXII, all corresponding parts are identified with the same reference numerals previously employed, except that here the letter "a" is associated with each numeral for convenience of distinction. The loom here illustrated is of the type in which the swords 9a of the lay 1a are secured to a shaft 171 journaled in the lower part of the loom frame. The lay is oscillated through a pitman 7a by crank 4a on the shaft 5a in a well known manner. The shuttle boxes, of which only the right hand box 17a is shown, are carried by the lay, and therefore move back and forth with it. This is also true of the picker sticks. As shown, the right hand picker stick 20a is pivoted at 22a to a bracket arm 172 affixed to the shaft 171, this construction, it is to be understood, being duplicated for the left hand picker stick. The pendant portion 146a of the elevator 68a associated with the right hand shuttle box 17a is formed, at its lower end, with a lateral extension 173 which has an arcuate slot 174 whereof the curvature is substantially concentric with the shaft 171, said slot being engaged by a roller 175 on the horizontal arm 147a of the bell crank lever 148a. The slot 174 allows for the swing of the lay 1a, and, taken jointly with the roller 175, constitutes the operative connection between the elevator 68a and the bell crank lever 148a. The elevator 68a is actuated in exactly the same manner as in the first described embodiment, through cooperation of the roller 151a on the pendant arm 150a of said bell crank lever with the rotary cam 152a on the shaft 14a. This arrangement, it is also to be understood, is duplicated at the left hand side of the loom for the depressor which is not illustrated. The actuating arm 50a on the rock shaft 48a on the weft replenishing mechanism is in this case coupled at 51a with an arm 52a fulcrumed at 53a on the loom frame. Pivotally connected at 176 to the arm 52a, is a finger 177 with a lateral projection 178 adapted to be engaged by the armature 157a of the solenoid 156a. Normally, the finger 177 occupies the lowered position shown in dot and dash lines in Fig. XXI and in full lines in Fig. XXII, but, upon energization of the solenoid, said finger is raised to the level of a bunter 179 on the lay 1a as shown in full lines in Fig. XXI. Accordingly, when the lay 1a moves forward on the succeeding beat stroke, the finger 177 is struck by the bunter 179 with resultant actuation of the weft replenishing mechanism and insertion of a new bobbin B¹ from the magazine 18a from above into the particular shuttle at that time in the shuttle box 17a. In all other respects, the construction and operation of the various coordinated mechanisms of the loom shown in Figs. XXI and XXII are exactly as in the first described embodiment.

Having thus described my invention, I claim:

1. In a multi-shed loom, a pair of shuttles; a multi-cell non-shifting shuttle box at each side of the loom; means for concurrently projecting the shuttles in opposite directions from the respective shuttle boxes through the superposed warp sheds formed incident to the weaving; automatic means operative after the end of each shuttle flight to elevate the shuttle in one box from one cell to another and to depress the shuttle in the other box from one cell to another so that the shuttles pass successively through the respective warp sheds always in the same directions.

2. In a multi-shed loom, a pair of shuttles; a non-shifting multi-cell shuttle box at each side of the loom one of said shuttle boxes having a vertical bobbin passage therethrough; replenishing initiating means; means for concurrently projecting the shuttles in opposite directions from the respective shuttle boxes through the superposed warp sheds formed incident to the weaving; automatic means operative after the end of each shuttle flight to elevate the shuttle in one box from one cell to another and to depress the shuttle in the other box from one cell to another so that said shuttles pass successively through the respective warp sheds always in the same directions; and automatic mechanism associated with one of the shuttle boxes, operative, after the call for replenishment of the shuttles, to place a new supply of weft into them individually from above, when said shuttles are at the upper level in the last referred to shuttle box.

3. In a multi-shed loom, a pair of shuttles; a multi-cell non-shifting shuttle box at each side of the loom, said shuttle boxes having upper and lower cells set apart in them by medially disposed outwardly yielding dividing ledges; means for concurrently projecting the shuttles in opposite directions from the respective shuttle boxes through the superposed warp sheds formed incident to the weaving; automatic mechanism for vertically shifting the shuttles in the shuttle boxes from one cell to another of the respective boxes; after the end of each flight to determine their successive passage always in the same directions through the respective sheds, said mechanism including an elevator in one box and a depressor in the other box and means for actuating said elevator and depressor concurrently.

4. In a multi-shed loom, a pair of shuttles; a multi-cell non-shifting shuttle box at each side of the loom, said multi-cell shuttle boxes having upper and lower cells set apart in them by medially disposed outwardly yielding dividing ledges; means for concurrently projecting the shuttles in opposite directions from the respective shuttle boxes through the superposed warp sheds formed incident to the weaving; automatic mechanism for vertically shifting the shuttles in the shuttle boxes from one cell to another of the respective boxes; after the end of each flight to determine their passage successively in the same directions through the respective sheds, said mechanism including a vertically-open elevator in one box, and a depressor in the other box, and means for actuating said elevator and depressor concurrently.

5. In a multi-shed loom, a picker shift, a shuttle box at each side of the loom, said boxes having upper and lower cells set apart in them by medially-disposed outwardly-yielding dividing ledges; pickers for concurrently projecting the shuttles in opposite directions from the respective shuttle boxes through the superposed warp sheds formed incident to the weaving; a picker shaft; and automatic mechanism for vertically shifting the shuttles after the end of each flight for successive passage always in the same directions through the respective sheds, including an elevator in one box, and a depressor in the other box, and connections whereby said elevator and the depressor are concurrently actuated from the picker shaft.

6. In a multi-shed loom, a shuttle box at each side of the loom, said boxes having upper and lower cells set apart in them by medially-disposed outwardly-yielding ledges; means for concurrently projecting the shuttles in opposite directions from the respective shuttle boxes through the superposed warp sheds formed incident to the weaving; and automatic mechanism for vertically shifting the shuttles after the end of each flight to determine their successive passage always in the same directions through the respective sheds, said mechanism including an elevator in one box, a depressor in the other box, a rotating shaft, rotary cams on said shaft, and interposed actuating connections between said elevator and depressor and the respective rotary cams.

7. In a multi-shed loom, a pair of shuttles; a shuttle box at each side of the loom, said boxes having upper and lower cells set apart in them by medially-disposed outwardly-yielding dividing ledges; pickers for concurrently projecting the shuttles from the respective boxes through superposed warp sheds formed incident to the weaving; automatic mechanism for vertically shifting the shuttles in the respective boxes after the end of each flight for successive passage always in the same directions through the respective sheds; and means for advancing the pickers from a retracted shuttle clearing position into engagement with the shuttles immediately after the shifting of the latter as aforesaid in preparation for each picking operation.

8. In a multi-shed loom, a pair of shuttles; a shuttle box at each side of the loom; medially-disposed outwardly-yielding dividing ledges setting apart upper and lower shuttle cells in said shuttle boxes; pickers for concurrently projecting the shuttles from the respective boxes through the superposed warp sheds formed incident to the weaving; means for actuating the pickers including pivoted sticks, rock shafts having arms connected to the picker sticks; a rotating shaft, picker balls carried by the rotating shaft, and wing cams on the rock shafts adapted to be wiped by the picker balls; automatic mechanism for vertically shifting the shuttles in the boxes after the end of each flight for successive passage always in the same directions through the respective sheds; and means for advancing the pickers from retracted shuttle clearing positions into engagement with the shuttles immediately after the shifting of the latter as aforesaid in preparation for each picking operation, said means comprising rotary cams on the rotating shaft aforesaid and cooperating rollers on the wing cams aforesaid.

9. In a multi-shed loom, a pair of shuttles; a shuttle box at each side of the loom; medially-disposed outwardly-yielding dividing ledges setting apart upper and lower cells in the respective shuttle boxes; means for concurrently projecting the shuttles in opposite directions from the respective shuttle boxes through the superposed warp sheds formed incident to the weaving; automatic means operative after the end of each shuttle flight to elevate the shuttle in one box and to depress the shuttle in the other box so that said shuttles successively pass through the respective warp sheds always in the same directions; and shuttle stops in the respective boxes, said stops having capacity for yielding to displacement so as to facilitate vertical shifting of the shuttles in the boxes aforesaid.

10. In a multi-shed loom, a lay; a pair of shuttles; means for concurrently projecting the respective shuttles from opposite sides of the loom across the lay; means for determining flight of the shuttles successively in one direction through one of the superposed warp sheds formed incident to the weaving, and successively in the opposite direction through the other shed; mechanism at one side of the loom actuated from the lay for replenishing the weft in the respective shuttles after the end of their flight in one direction including a weft bobbin storage magazine with a plunger for ejecting a bobbin at each actuation, a rock shaft with connections to the plunger, an actuating arm on the rock shaft, and a normally idle lever on the lay adapted to be coupled with the arm on the rock shaft; and automatic mechanism for controlling the operation of the weft replenishing mechanism so that the shuttles are individually replenished at different times, the latter mechanism including an electric device for coupling the lever on the lay with the arm on the rock shaft aforesaid, a moving member with spaced contact lugs thereon, and a switch in circuit with the electric device adapted to be closed successively by the spaced lugs.

11. In a bobbin-changing loom, replenishing mechanism on one side of the loom having a supply of bobbins; a non-shifting shuttle box having separate ingress and egress compartments; a shuttle; and means for moving the supply of bobbins; a non-shifting shuttle box from the ingress compartment to the egress compartment to position it for the insertion of a bobbin from the supply.

12. In a bobbin-changing loom, replenishing mechanism on one side of the loom having a supply of bobbins; a non-shifting shuttle box having separate ingress and egress compartments; a shuttle; and means for vertically moving the shuttle within and relative to the shuttle box from the ingress compartment to the egress compartment to position it for the insertion of a bobbin from the supply.

13. In a bobbin-changing loom, replenishing mechanism on one side of the loom having a supply of bobbins; a non-shifting shuttle box having separate ingress and egress compartments; a shuttle; means for vertically moving the shuttle within and relative to the shuttle box from the ingress compartment to the egress compartment to position it for the insertion of a bobbin from the supply; and means for transferring a bobbin substantially vertically into the shuttle when so positioned.

14. In a loom of the class described, replenishing mechanism; a shuttle; a non-shifting shuttle box having separate ingress and egress compartments; a shuttle check on a side of said box; and means for shifting the shuttle within the box from one compartment to the other comprising a portion which serves to hold the shuttle check in its outer position while the shuttle is being moved within the box.

15. In a loom of the class described, replenishing mechanism; a shuttle; a non-shifting shuttle box having separate ingress and egress compartments; a shuttle check; means for moving the shuttle from one compartment to the other within the box and relative thereto; and a fulcrum for said shuttle check about which the shuttle check may pivot when the shuttle is moved from one compartment to another.

16. In a loom of the class described, replenishing mechanism; a shuttle; a non-shifting shuttle box having separate ingress and egress compartments; means for moving the shuttle within the box from the ingress compartment to the egress compartment; and picking mechanism including a picker aligned with the egress compartment, and an actuator therefor comprising means for imparting two different movements to the picker after the movement of the shuttle to the egress compartment.

17. In a multi-shed loom, a shuttle, a multi-cell non-shifting shuttle box on one side of the loom having a bobbin passage therethrough, means for shifting the shuttle within the box from one cell to another after the shuttle is boxed, a replenishing mechanism including a transfer member on one side of the loom, actuating means for the transfer member incident to the call for replenishment for moving the transfer member to replenish the weft after the shuttle has been shifted.

18. In a multi-shed loom according to claim 5, including a vertical bobbin passage through one shuttle box, replenishing initiating means and means operative after the call for replenishment of the shuttles to replenish the weft in them individually after the shifting of the shuttles in said shuttle box.

19. In a multi-shed loom according to claim 6, including a vertical bobbin passage through one shuttle box, replenishing initiating means and means operative after the call for replenishment of the shuttles to replenish the weft in them individually after the shifting of the shuttles in said shuttle box.

20. In a multi-shed loom according to claim 7, including a vertical bobbin passage through one shuttle box, replenishing initiating means and means operative after the call for replenishment of the shuttles to replenish the weft in them individually after the shifting of the shuttles in said shuttle box.

21. In a multi-shed loom according to claim 8, including a vertical bobbin passage through one shuttle box, replenishing initiating means and means operative after the call for replenishment of the shuttles to replenish the weft in them individually after the shifting of the shuttles in said shuttle box.

22. In a multi-shed loom according to claim 9, including a vertical bobbin passage through one shuttle box, replenishing initiating means and means operative after the call for replenishment of the shuttles to replenish the weft in them individually after the shifting of the shuttles in said shuttle box.

WHITWORTH F. BIRD.

CERTIFICATE OF CORRECTION.

Patent No. 2,139.994. December 13, 1938.

WHITWORTH F. BIRD.

It is hereby certified that error appears in the printed specification of the above numbered patent requiring correction as follows: Page 5, first column, line 67, claim 5, for the word "shift" read shaft; page 6, first column, line 38, claim 11, strike out "supply of bobbins; a non-shifting" and insert instead the words shuttle within and relative to the; and that the said Letters Patent should be read with this correction therein that the same may conform to the record of the case in the Patent Office.

Signed and sealed this 21st day of February, A. D. 1939.

(Seal)

Henry Van Arsdale.
Acting Commissioner of Patents.